US012771089B2

(12) United States Patent
Haynes et al.

(10) Patent No.: US 12,771,089 B2
(45) Date of Patent: Oct. 20, 2026

(54) SWITCHING MECHANISM FOR A MULTI-SPECTRAL LASER TRANSMITTER

(71) Applicant: Raytheon Company, Waltham, MA (US)

(72) Inventors: Evan Haynes, McKinney, TX (US); Kyle Douglas Weichman, Mckinney, TX (US); Jeffrey L. Sabala, Northridge, CA (US)

(73) Assignee: Raytheon Company, Arlington, VA (US)

( * ) Notice: Subject to any disclaimer, the term of this patent is extended or adjusted under 35 U.S.C. 154(b) by 968 days.

(21) Appl. No.: 17/827,610

(22) Filed: May 27, 2022

(65) Prior Publication Data

US 2023/0387645 A1 Nov. 30, 2023

(51) Int. Cl.
*H01S 3/08* (2023.01)
*H01S 3/00* (2006.01)

(52) U.S. Cl.
CPC .......... *H01S 3/0809* (2013.01); *H01S 3/0071* (2013.01); *H01S 3/0085* (2013.01)

(58) Field of Classification Search
CPC .... H01S 3/0071; H01S 3/0078; H01S 3/0085; G02B 26/007; G02B 26/008; G02B 21/248; G02B 7/16
See application file for complete search history.

(56) References Cited

U.S. PATENT DOCUMENTS

| | | | | |
|---|---|---|---|---|
| 3,792,916 | A | 2/1974 | Sarna | |
| 6,542,534 | B1 * | 4/2003 | Svilans | H01S 5/02251 372/20 |
| 6,816,534 | B2 | 11/2004 | Flint et al. | |
| 2003/0147087 | A1 * | 8/2003 | Nolte | G02B 21/248 356/614 |
| 2004/0061861 | A1 * | 4/2004 | Rentzsch | G02B 21/248 250/231.13 |
| 2009/0021851 | A1 * | 1/2009 | Janicek | G02B 26/008 359/892 |
| 2017/0031125 | A1 * | 2/2017 | Lee | G02B 26/008 |
| 2017/0102515 | A1 * | 4/2017 | Du | G02B 7/006 |
| 2020/0149957 | A1 * | 5/2020 | Ragatz | G01J 1/0488 |
| 2021/0215920 | A1 * | 7/2021 | Forster | G02B 21/0044 |
| 2021/0382287 | A1 * | 12/2021 | Stegmann | G02B 21/16 |

FOREIGN PATENT DOCUMENTS

| | | | | |
|---|---|---|---|---|
| KR | 20080086642 | A | * | 9/2008 |
| KR | 101187391 | B1 | * | 10/2012 |

* cited by examiner

*Primary Examiner* — Bumsuk Won

(57) ABSTRACT

An modular optical switching system and switching mechanism for a multispectral laser transmitter are provided. The system includes a modular housing; a moveable carrier connected to and disposed within the modular housing; a first optical member supported by the moveable carrier; and a second optical member supported by the moveable carrier. The moveable carrier is operable to selectively move the first optical member into alignment with a laser beam of the multispectral laser transmitter and to selectively move the second optical member into alignment with the laser beam of the multispectral laser transmitter.

20 Claims, 5 Drawing Sheets

SWITCHING MECHANISM FOR A MULTI-SPECTRAL LASER TRANSMITTER

GOVERNMENT LICENSE RIGHTS

This invention was made with Government support. The Government has certain rights in the invention.

BACKGROUND

One characteristic of multispectral laser transmitters that use an optical parametric amplifier is that they can produce multiple wavelengths by conversion of a single pump wavelength through non-linear crystals. This can be useful in applications requiring laser beams at different wavelengths while using only a single laser transmitter.

However, the conversion process to produce the multiple different wavelengths is not 100% efficient. Accordingly, there can be residual pump light that is leftover in the process. This residual high pulse energy light can interfere with a desired application of the multispectral laser transmitter. In some applications, only specific wavelengths are desirable, such as two or more specific wavelengths without any other light interference. In some applications, for example, it can be desirable to have a high pulse energy laser beam at a first wavelength, and a low power laser beam at a second wavelength. Further, in some applications, it is desirable that outputs at the various wavelengths are repeatable and that the pointing direction of the outputs are stable regardless of host platform motion.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
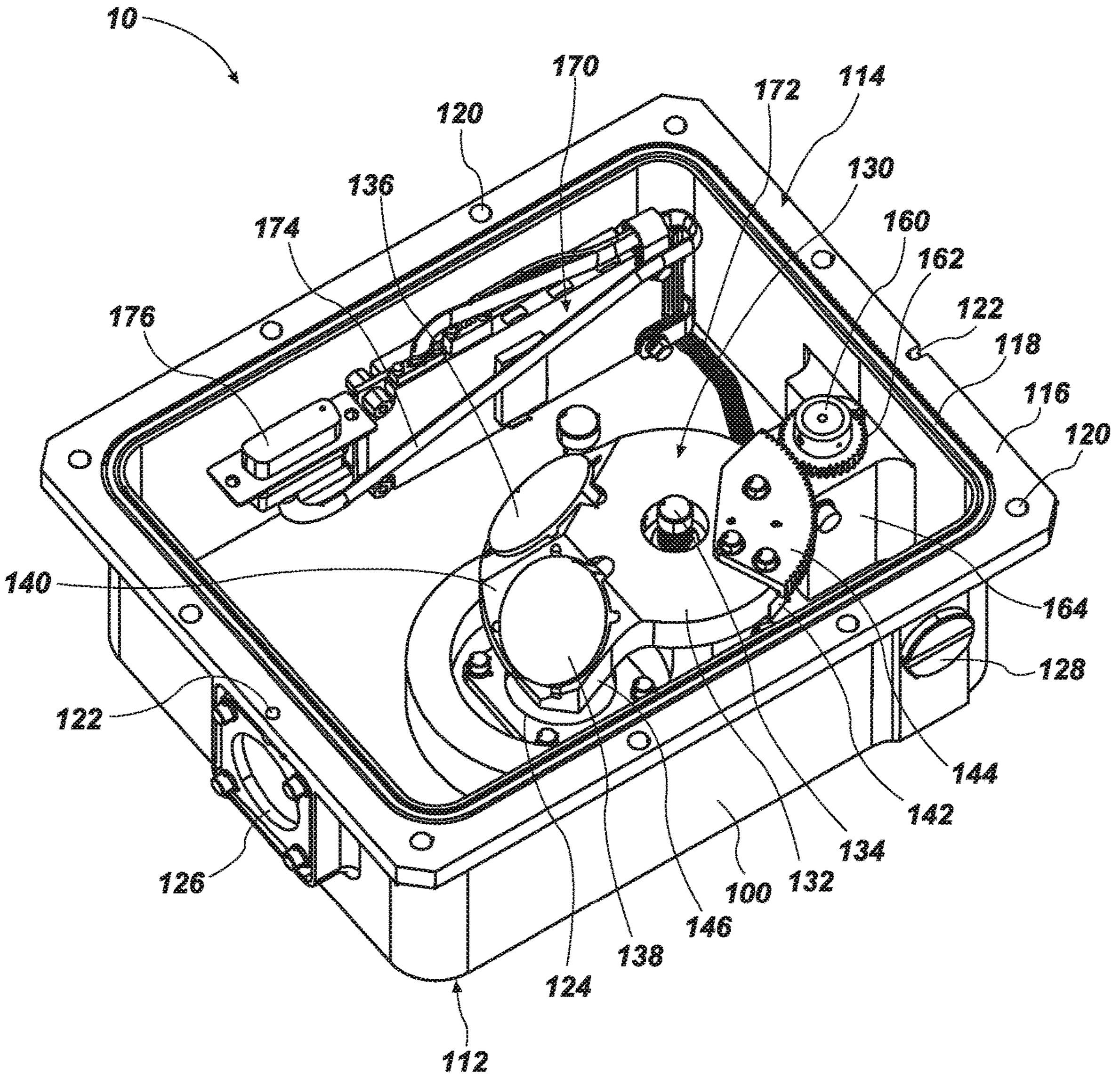
FIG. 1 is a bottom, front isometric view of a modular switching system for a multi-spectral laser transmitter according to one example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

In the present disclosure, a switching mechanism and switching system for a multi-spectral laser transmitter are provided. The switching mechanism and switching system allow outputs from a multi-spectral laser transmitter at different wavelengths to be repeatable while maintaining a stable pointing direction regardless of host platform motion.

In one example, a switching mechanism for a multispectral laser transmitter is provided. The switching mechanism can comprise a moveable carrier, a first optical member supported by the moveable carrier, and a second optical member supported by the moveable carrier. The moveable carrier can be operable to selectively move the first optical member into alignment with a laser beam of the multispectral laser transmitter and to selectively move the second optical member into alignment with the laser beam of the multispectral laser transmitter.

In one example, the moveable carrier can be supported by and rotatable about an axle. The first and second optical members can be supported along a first side of the moveable carrier. The moveable carrier can further comprise a counterweight that is disposed on a second side of the moveable carrier opposite the first side to balance the moveable carrier about the axle. The moveable carrier can be rotated about the axle by an actuator. The moveable carrier can further comprise a cogged member that interfaces with a gear member. The actuator can comprise a motor operable to drive the gear member.

In another example, the moveable carrier can further comprise a first stop surface that interfaces with a first stop when the first optical member is in alignment with the laser beam of the multispectral laser transmitter, and a second stop surface that interfaces with a second stop when the second optical member is in alignment with the laser beam of the multispectral laser transmitter. An actuator can be controlled by a controller that is operable to cause the actuator to move the optical carrier such that the first stop surface comes into contact with the first stop to align the first optical member with the laser beam of the multispectral laser transmitter, and to cause the actuator to move the optical carrier such that the second stop surface comes into contact with the second stop to align the second optical member with the laser beam of the multispectral laser transmitter.

In one example, when the first stop surface comes into contact with the first stop, the controller can be operable to cause the actuator to maintain a force on the optical carrier to bias the first stop surface against the first stop. When the second stop surface comes into contact with the second stop, the controller can be operable to cause the actuator to maintain a force on the optical carrier to bias the second stop surface against the second stop. The controller can further be operable to cause the actuator to decelerate the optical carrier prior to the first stop surface coming into contact with the first stop and to cause the actuator to decelerate the optical carrier prior to the second stop surface coming into contact with the second stop.

In one example, the moveable carrier can comprise a plurality of detents. The plurality of detents can be operable to interface with a spring-loaded ball plunger to stabilize the moveable carrier while a selected one of the first optical member or the second optical member is in alignment with the laser beam of the multispectral laser transmitter.

In another example, the first optical member can comprise a first filter that filters light at a first wavelength, and the second optical member can comprise a second filter that filters light at a second wavelength. In another example, the first optical member can comprise a first filter that filters light at a first wavelength, and the second optical member can comprise a mirror that acts as a shutter and reflects the laser beam. In some examples, at least one of the first optical member or the second optical member comprises a polarizer.

In another example according to the present disclosure, a modular optical switching system for a multispectral laser transmitter is provided. The system can comprise a modular housing, a moveable carrier connected to and disposed within the modular housing, a first optical member supported by the moveable carrier, and a second optical member supported by the moveable carrier. The moveable carrier can be operable to selectively move the first optical member into alignment with a laser beam of the multispectral laser transmitter and to selectively move the second optical member into alignment with the laser beam of the multispectral laser transmitter.

In one example, the modular housing can comprise a connecting flange operable to mount the modular housing to a housing of the multispectral laser transmitter. The connecting flange can comprise alignment guides operable to receive alignment pins of the housing of the multispectral laser transmitter to align modular optical switching system with the multispectral laser. The connecting flange can further comprise through holes extending through the connection flange operable to receive a fastener to mount the connecting flange to the housing of the multispectral laser transmitter.

In one example, the modular optical system can further comprise an output filter window operable to facilitate transmission of an output portion of the laser beam of the multispectral laser that passes through the first optical member or the second optical member, and a dump filter window operable to facilitate transmission of a reflected portion the laser beam of the multispectral laser that is reflected by the first optical member or the second optical member to a beam dump. In some examples, the modular optical switching system can comprise an axle mounted to the housing. The moveable carrier can be supported by and can be rotatable about the axle.

In one example, the modular optical switching system can further comprise a controller, a first stop, and a second stop. The moveable carrier can further comprise a first stop surface that interfaces with the first stop when the first optical member is in alignment with the laser beam of the multispectral laser transmitter, and a second stop surface that interfaces with the second stop when the second optical member is in alignment with the laser beam of the multispectral laser transmitter. The controller can be operable to cause an actuator to move the optical carrier such that the first stop surface comes into contact with the first stop to align the first optical member with the beam of the multispectral laser transmitter, and to cause the actuator to move the optical carrier such that the second stop surface comes into contact with the second stop to align the second optical member with the beam of the multispectral laser transmitter. In some examples, when the first stop surface comes into contact with the first stop, the controller can be operable to cause the actuator to maintain a force on the optical carrier to bias the first stop surface against the first stop, and, when the second stop surface comes into contact with the second stop, the controller can be operable to cause the actuator to maintain a force on the optical carrier to bias the second stop surface against the second stop.

In another example of the present disclosure, a method for refining a laser beam from a multispectral laser transmitter is provided. The method can comprise attaching a modular housing of a switching system to a laser housing of the multispectral laser, moving a first optical member of the optical switching system to align with a laser beam transmitted from the multispectral laser transmitter, and moving a second optical member of the optical switching system to align with the laser beam transmitted from the multispectral laser transmitter.

In some examples, the first optical member can comprise a first wavelength filter and, when the first optical member is moved to align with laser beam transmitted from the multispectral laser transmitter, the method can comprise outputting a first output beam having first properties comprising a first wavelength. The second optical member can comprise a second wavelength filter and, when the second optical member is moved to align with laser beam transmitted from the multispectral laser transmitter, the method can further comprise outputting a second output beam having second properties comprising a second wavelength. In another example, the second optical member can comprise a mirror that reflects the laser beam to a beam dump.

Figure 2:
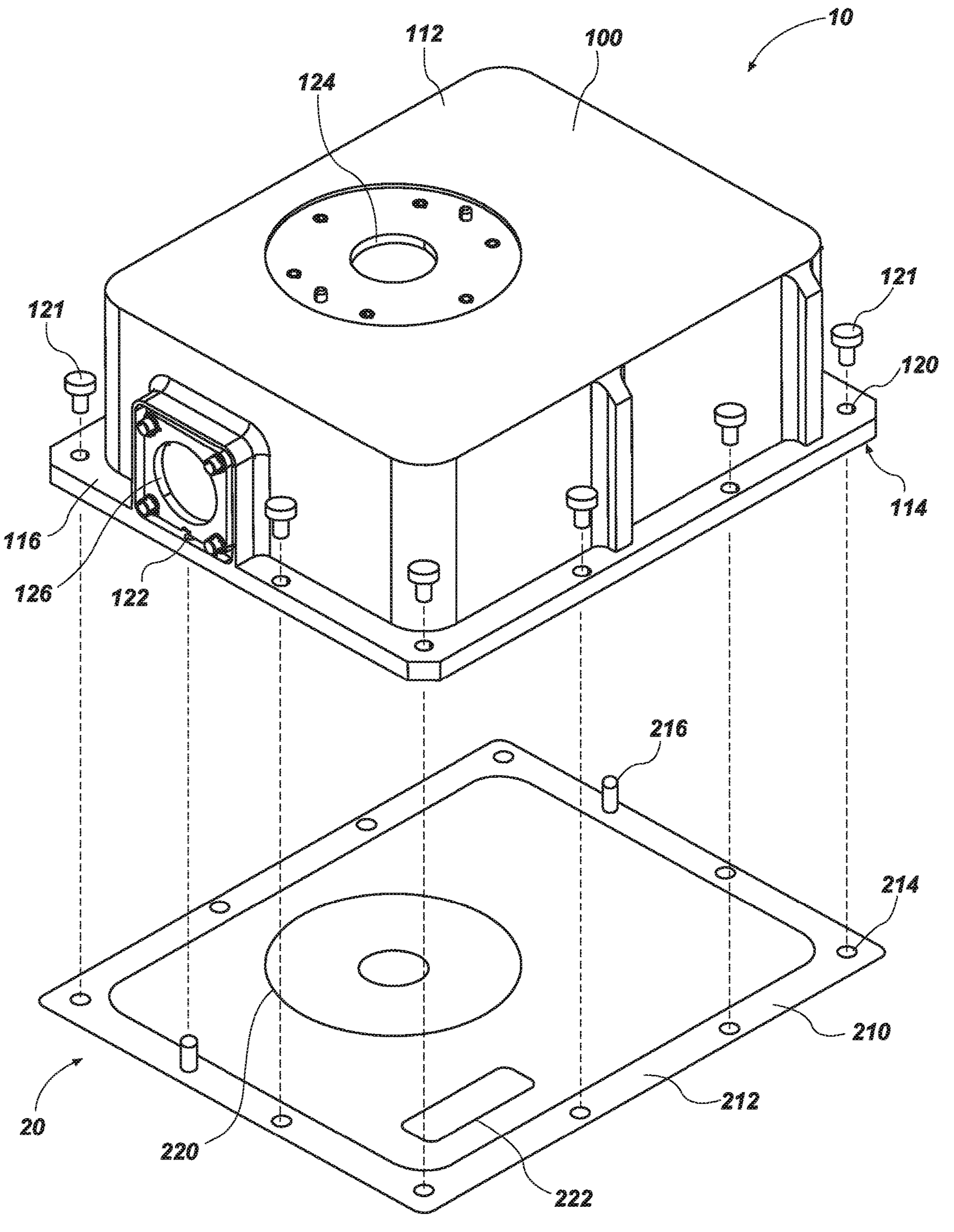
FIG. 2 is a top, front isometric view of the modular switching system of FIG. 1 shown in relation to a multi-spectral laser transmitter.
Figure 3:
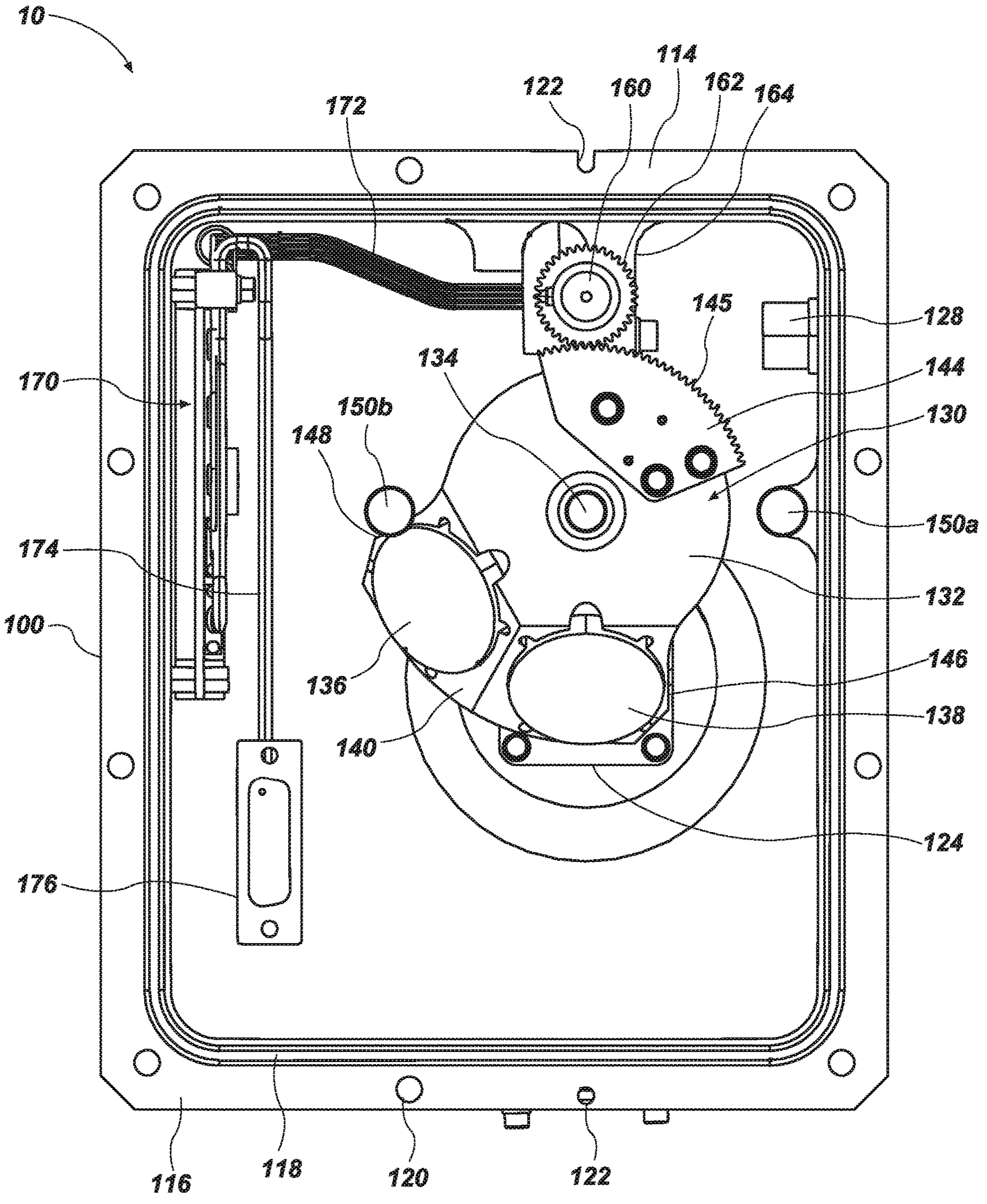
FIG. 3 is a bottom view of the modular switching system of FIG. 1.
Figure 4A:
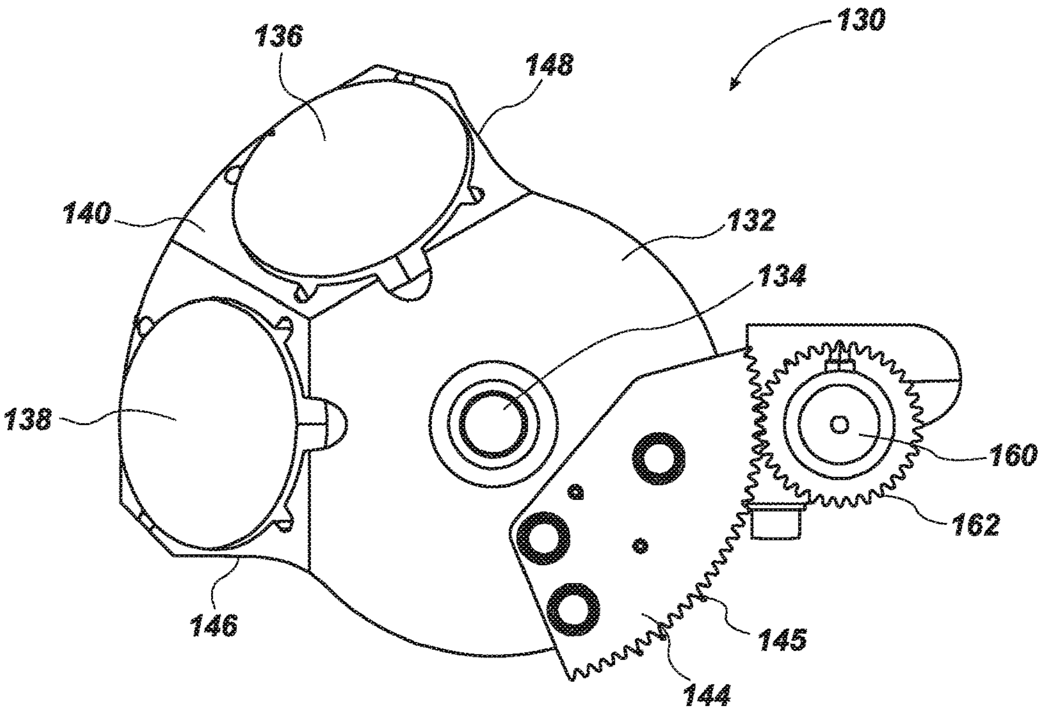
FIG. 4A is a bottom view of a switching mechanism of the switching system shown in FIG. 1.
Figure 4B:
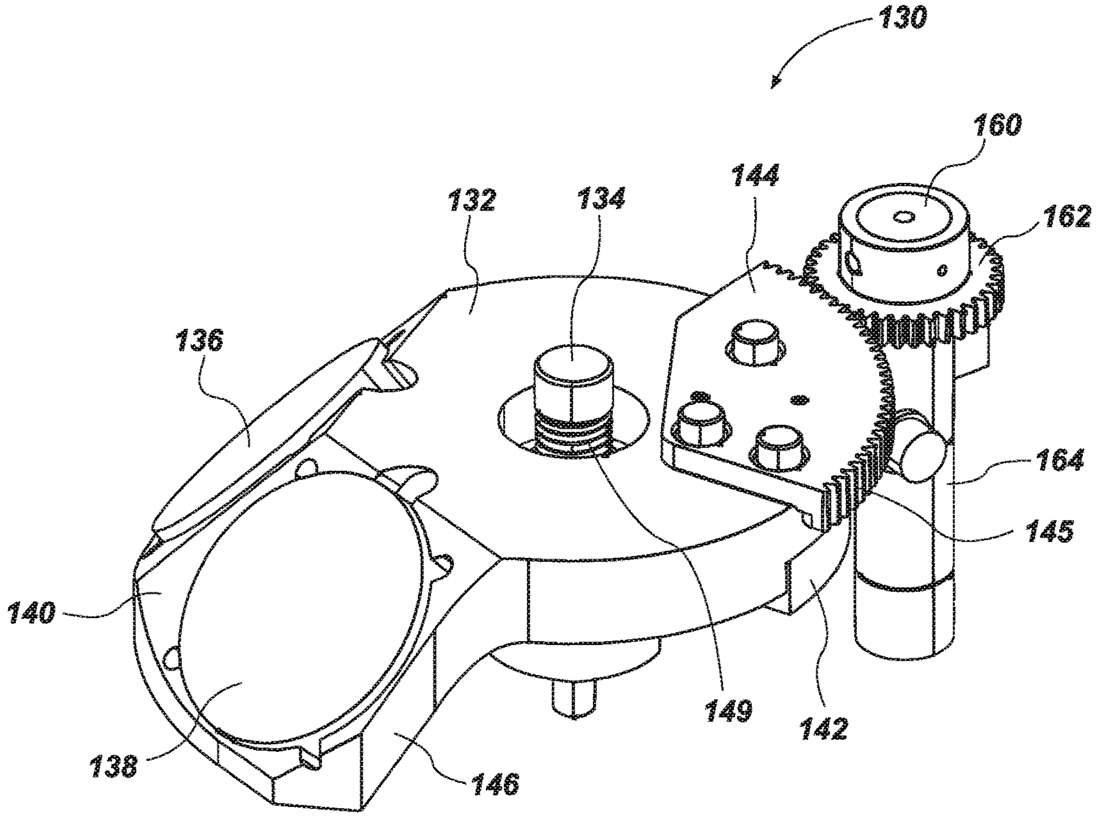
FIG. 4B is an isometric view of the switching mechanism shown in FIG. 4A.

To further describe the present technology, examples are now provided with reference to the figures. FIGS. 1-3 shows a switching system for a multispectral laser transmitter. The switching system 10 shown in FIGS. 1-3 can be a modular switching system. That is, the switching system 10 can be used with multiple different multispectral laser transmitters. The switching system 10 can thus be operable to be removable and reattachable to a multispectral laser transmitter 20 (FIG. 2).

The switching system 10 can comprise a modular housing 100 having a top side 112 and an open bottom side 114. The bottom side 114 can be operable to seat against a housing 210 of a multispectral laser transmitter, such as multispectral laser transmitter 20. For example, the modular housing 100 can comprise a connecting flange 116 disposed on the bottom side 114 of the modular housing 100. The connecting flange 116 can be operable to seat against the housing 210 of the multispectral laser transmitter 20. The modular housing 100 can further comprise a sealing member 118, such as a gasket or other type of sealing member, that is disposed on the bottom side 114 of the modular housing 100. The sealing member 118 can interface with a sealing surface 212 of the housing 210 to seal the modular housing 100 to the multispectral laser transmitter 20. The modular housing 100 can also comprise a desiccant plug 128 that aids in removing moisture from the modular housing 100.

The modular housing 100 can further comprise a plurality of through holes 120 that extend through the connecting flange 116. The plurality of through holes 120 can correspond to holes 214 of the multispectral laser transmitter 20 that are operable to receive fasteners 121 to fasten the modular housing 100 to the multispectral laser transmitter 20 and to pressure the sealing member 118 against the sealing surface 212. However, it is contemplated herein that the modular housing 100 can be coupled to the multispectral laser transmitter 20 using other couplers besides fasteners, such as a latch system, or others as will be apparent to those skilled in the art.

The modular housing 100 can further comprise alignment guides 122 to properly align the switching system 10 with the multispectral laser transmitter 20. The alignment guides 122 can comprise a through hole extending through the connecting flange 116 and/or can comprise a cutout or indent formed in the connecting flange 116. The alignment guides 112 can be operable to receive alignment pins 216 such as dowels that extend from the interface 210 of the multispectral laser transmitter 20. The interface between the alignment pins 216 and the alignment guides 122 can ensure that the switching system 10 is in alignment with the multispectral laser transmitter 20 prior to tightening the fasteners 121 inserted through the through holes 120 and into receiving holes 214.

The connection between the modular housing 100 of the switching system 10 and the multispectral laser transmitter 20 can be designed to be removable, thus allowing the switching system 10 to be modular (i.e., interchangeable). For example, the modular housing 100 can be coupled and sealed against a first multispectral laser transmitter and then can be removed from the first multispectral laser transmitter to be used with (i.e., coupled and sealed to) a second multispectral laser transmitter.

The housing 100 can further comprise an output filter window 124 disposed on the top side 112 of the housing. The output filter window 124 can be operable to facilitate transmission of a filtered output of the beam of the multispectral laser transmitter 20 that is output by the switching mechanism 10.

The housing 100 can further comprise a dump filter window 126 that can be operable to facilitate transmission of a reflected portion of the beam of the multispectral laser transmitter 20 that is reflected by the switching mechanism 10 to a beam dump to remove unwanted light from the beam of multispectral laser transmitter 20.

The switching system 10 further comprises a switching mechanism 130 that is disposed within the modular housing 100 and that is shown in FIGS. 1 and 3-4B. The movable carrier 130 can be operable to move two or more optical members 136, 138 to be in alignment with the multispectral laser transmitter 20 as will be described in more detail below.

In this example, the switching mechanism 130 can comprise a moveable carrier 132 that is rotatably mounted about an axle 134, such that the moveable carrier 132 can rotate about an axis defined by the axle 134. As shown in this example, the axle 134 can extend through the moveable carrier 132, such that the moveable carrier 132 rotates around the axle 134. The moveable carrier 132 can be rotatably attached to the axle 134 via any suitable manner now known or later developed, such as via one or more bearing assemblies. A spring 149 can be provided (see FIG. 4B) to bias the moveable carrier 132 against a bearing assembly to provide for stable relative movement between the moveable carrier 132 and the axle 134.

The switching mechanism 130 can support a first optical member 136 and a second optical member 138. While two optical members 136, 138 are shown in this example, it should be understood that more than two optical members could also be incorporated. The first and second optical members 136, 138 can be any desired optical members according to a desired application. In one example, the first optical member 136 can be an optical filter that filters light at a first wavelength (i.e. allows light of the first wavelength to pass through the filter and reflects light outside of the first wavelength). The second optical member 138 can be an optical filter that filters light at a second wavelength (i.e. allows light of the second wavelength to pass through the filter and reflects light outside of the second wavelength).

When using a multispectral laser transmitter (such as multispectral laser transmitter 20), the first and second optical members 136, 138 as optical wavelength filters at first and second wavelengths, respectively, can further refine a beam of light emitted from the multispectral laser transmitter. That is, the wavelength filters can filter the laser beam emitted from the multispectral laser transmitter to allow only certain wavelengths to pass through the wavelength filters while reflecting all other wavelengths. Thus, when the multispectral laser transmitter emits a beam of light at the first wavelength, the first optical member 136 can refine the beam of light to ensure that only light of a desired wavelength passes through the filter and to ensure that no residual pump light from the multispectral laser passes through the first optical member 136. Similarly, when the multispectral laser transmitter emits a beam of light the second wavelength, the second optical member 138 can refine the beam of light to ensure that only light of a desired wavelength passes through the filter and to ensure that no residual pump light from the multispectral laser passes through the second optical member 138.

In another example, the first optical member 136 can comprise a mirror that can act as a shutter that does not allow any incident light pass through and reflects all incident light to the beam dump. The second optical member 138 can comprise an optical filter that filters light at a predetermined wavelength. In another example, the first optical member 136 can comprise a polarizer and the second optical member 138 can comprise a filter. In other examples, other combinations of filters, mirrors, polarizers, and/or other optical members/devices can be used.

The first and second optical members 136, 138 can be supported by an angled flange 140 that extends from the moveable carrier 132 of the switching mechanism 130. The angled flange 140 can be angled to extend at 45 degrees relative to the moveable carrier 132 of the movable carrier. The angle of the angled flange 140 can help to orient the optical members 136, 138 such that the optical members 136, 138 can allow light from an emitted laser beam from the multispectral laser transmitter 20 having desired properties (e.g. a desired wavelength) to pass through the optical members 136, 138 to the output filter window 124. Similarly, the angle of the angled flange 140 can orient the optical members 136, 138 such that undesirable light can be properly reflected through the dump filter window 126 to a beam dump. The angle of the angled flange 140 can further allow the optical members 136, 138 to operate correctly even when the moveable carrier 132 is still in motion or is not perfectly in alignment. Other angles other than 45 degrees can also be used depending on a desired modular housing shape and/or the desired output location of the outputted portion of the laser beam and the reflected portion of the laser beam.

The switching mechanism 130 can further comprise a counterweight 142 to help balance the moveable carrier 132 for rotation about the axle 134. The counterweight 142 can be attached to the moveable carrier 132 of the switching mechanism 130 or can be formed integrally with the moveable carrier 132 of the switching mechanism 130. The counterweight 142 can be disposed on an opposite side of the moveable carrier 132 from angled flange supporting the first and second optical members 136, 138 so that the moveable carrier 132 can be balanced about the axle 134.

The switching mechanism 130 is operable to selectively move one of the first or second optical members 136, 138 into alignment with a beam from the multispectral laser transmitter 20 and the output filter window 124. As shown in FIG. 2, a laser beam output 220 of the multispectral laser transmitter 20 can be caused to align with the output filter window 124 of the switching system 100. As shown in FIGS. 1 and 3, one of the first or second optical members 136, 138 can be caused to selectively be in alignment with the output filter window 124 and the laser beam output 220. Indeed, the switching mechanism 130 can be operated to rotate about the axle 134 to selectively move the one of the first or second optical members 136, 138 into alignment.

In one example, the moveable carrier 132 can be rotated via a geared mechanism. In one example, a cogged member 144 can be attached to or integrally formed with the moveable carrier 132 of the switching mechanism 130. The cogged member 144 can comprise a plurality of teeth 145 that interface with teeth 162 of a gear member 160. In this example, the gear member 162 is shown as a rotary, spur type gear. However, other types of gears could be used such as a worm gear, a bevel gear, or the like. Moreover, the geared mechanism can be configured with any specific gear ratio, as needed or desired.

The gear member 160 can be driven by an actuator such as a motor 164. The motor 164 can be operable to rotate the gear member 160. The interface between the teeth 162 of the gear member 160 and the teeth 145 of the cogged member 144 allows the gear member 160 to drive the switching mechanism 130 to selectively rotate one of the first or second optical members 136, 138 into alignment. It is noted that other mechanisms can be used to drive the moveable carrier, such as an actuator or motor disposed about the axle, and actuator attached to a linkage connected to the moveable carrier 132 of the switching mechanism 130, or the like.

The motor 164 can be controlled by a control unit 170. The control unit 170 can be any suitable computerized controller and can comprise a processor, one or more memory storing machine readable instructions that are executable by the processor, and one or more input and output devices. The control unit 170 can be communicatively coupled to the motor 160 via a communications bus 172. The control unit 170 can thus be operable to control the motor 160 to rotate the movable carrier 130 about the axle 134.

A connector 176 can be attached to the control unit 170 via a communication line 174. The connector 176 can connect to a port 222 of the multispectral laser transmitter 20. By connecting the control unit 170 to the multispectral laser transmitter 20, the control unit 170 can operate the motor 164 of the gear member 160 to rotate the switching mechanism 130 based on an operating state of the multispectral laser transmitter 20. For example, when the multispectral laser transmitter 20 is operated to emit light at a first wavelength, the control unit 170 can operate the motor 164 to move the switching mechanism 130 such that one of the first or second optical members 136, 138 corresponding with the first wavelength is moved into alignment with the beam emitted from the multispectral laser transmitter 20. When the multispectral laser transmitter 20 is operated to emit light at a second wavelength, the control unit 170 can operate the motor 164 to move the switching mechanism 130 such that the other of the first or second optical members 136, 138 corresponding with the second wavelength is moved into alignment with the beam emitted from the multispectral laser transmitter 20.

The control unit 170 can further operate the motor 164 of the gear member 160 to reduce vibrations or other movement from the switching system 10. By reducing vibrations or other movement, the stability of an overall system incorporating the switching system 10 can be increased. For example, the switching system 10 can comprise stops 150*a*, 150*b* that are attached to the modular housing 100. The stops 150*a*, 150*b* can correspond with stop surfaces 146, 148, respectively, on the moveable carrier 132 of the switching mechanism 130. When the moveable carrier 132 is rotated, such that one of the first or second optical members 136, 138 are in alignment with a beam from the multispectral laser transmitter 20, one of the stop surfaces 146, 148 can be configured to come into contact with a respective stop 150*a*, 150*b*. To increase stability of the switching system 10, the control unit 170 can operate the motor and gear member to cause and maintain a biasing force, wherein the respective stop surface 146, 148 is biased into the respective stop 150*a*, 150*b* and held there to maintain the bias as the beam from the multispectral laser transmitter 20 is caused to interact with the selected first or second optical members 136, 138 of the switching mechanism 130. By biasing the respective stop surface 146, 148 into the respective stop 150*a*, 150*b* during operation of the multispectral laser transmitter 20 and the switching system 10, stability of the switching system 10 can be enhanced by reducing any potential rotational motion in the switching system 10.

In another example, the control unit 170 can be operable to enhance stability of the switching system 10 by dynamically controlling the speed of the motor 164 of the gear member 160. The control unit 170 can operate the motor 164 such that the moveable carrier 132 of the switching mechanism 130 decelerates prior to the respective stop surface 146, 148 coming into contact with the respective stop 150*a*, 150*b*. This can prevent sudden impact of a stop surface 146, 148, with its respective stop 150*a*, 150*b*, thus further enhancing stability of the switching system 10.

In operation, the modular housing 100 can be attached to the multispectral laser transmitter 20 by aligning the alignment guides 122 with the alignment pins 216 and fastening the fasteners 121 through the through 120 to corresponding holes of a housing 210 of the multispectral laser transmitter 20. The gasket 118 seals against the sealing surface 212 of the housing 210, thereby sealing the module housing 100 to the multispectral laser transmitter 20.

The control unit 170 can be operated to control the motor 164 of the gear member 160 to rotate the moveable carrier 132 of the switching mechanism 130 about the axle 134, such that one of the first or second optical members 136, 138 is in alignment with the laser beam output 220 of the multispectral laser transmitter 20 and the output filter window 124 of the modular housing 100. The control unit 170 can control the motor 164, such that a stop surface 146, 148 comes into contact with a respective stop 150*a*, 150*b* after decelerating to avoid a sudden impact with the respective stop 150*a*, 150*b*, wherein the control unit 170 can cause a biasing force to be generated and maintained between the respective stop surface 146, 148 and respective stop 150*a*, 150*b*. Once in alignment, the desired optical member 136, 138 can be used to filter, reflect, orient, or otherwise interact with a laser beam emitted from the laser beam output 220. In one example, the desired optical member 136, 138 can be a wavelength filter and can allow light of a predetermined wavelength to pass through the wavelength filter and that can reflect other wavelengths of light incident on the wavelength filter. With the desired optical member 136, 138 disposed on the angled flange 140 of the moveable carrier, light in the laser beam at the predetermined wavelength can pass through the desired optical member 136, 138 as an output beam through the output filter window 124. Light in the laser beam outside of the predetermined wavelength can be reflected by the wavelength filter through the dump filter window 126 to a beam dump.

While the laser beam output 220 emits the laser beam through the desired optical member 136, 138, the control unit 170 can operate the motor 164 to maintain a residual current to bias the respective stop surface 146, 148 into the respective stop 150*a*, 150*b*. Thus, while the desired optical member 136, 138 interfaces with the laser beam from the laser beam output 220, the switching system 10 is stable and does not contribute any motion to the overall system.

When the other of the optical members 136, 138 is desired for use, such as a second wavelength filter to filter the laser beam at a second wavelength, the control unit 170 can operate the motor to move the moveable carrier 132 of the switching mechanism 130, such that the other of the optical member 136, 138 is in alignment with the laser beam from the laser beam output 220. Similar as before, the controller can decelerate the moveable carrier 132 prior to the respective stop surface 146, 148 coming into contact with the respective stop 150*a*, 150*b*, and can maintain a biasing force of the respective stop surface 146, 148 against the respective stop 150*a*, 150*b*.

Several modifications can be made to the switching system 10, and thus the switching system 10 should not be considered limited to the examples illustrated in FIGS. 1-4B. For example, a gear ratio between the gear member 160 and the cogged member 144 of the switching mechanism 130 may be adjusted as desired for a given application or for the number of optical elements included in the switching mechanism. In one example, the gear ratio can be 64:1. In other examples the gear ratio can be greater or less than 64:1.

Figure 5:
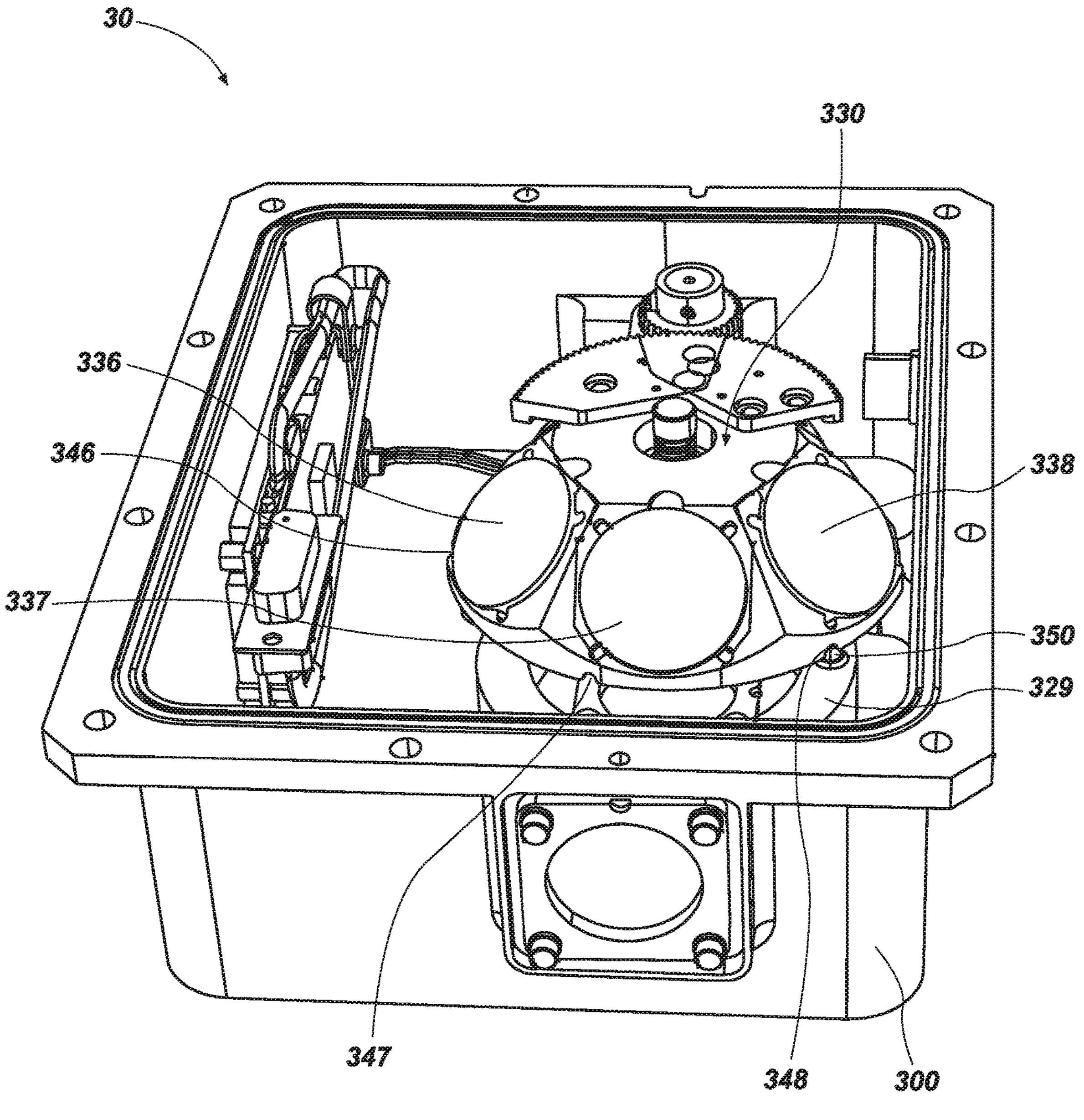
FIG. 5 is a bottom, front isometric view of a modular switching system for a multi-spectral laser transmitter according to one example of the present disclosure.

In some examples, another stability system can be utilized in place of the stops 150*a*, 150*b*. FIG. 5 shows another example of a modular switching system for a multi-spectral laser transmitter. A modular switching system 30 shown in FIG. 5 is similar to the modular switching system 10 described above, and thus a full description will not be repeated here. The switching system 10 can comprise a modular housing 300 that includes an annular flange 329. A spring-loaded ball plunger 350 can be mounted on the annular flange 329. The moveable carrier 330 can comprise a plurality of detents 346, 347, 348. Each of the detents 346, 347, 348 can be operable to interface with the spring-loaded ball plunger 350. For example, when the moveable carrier 330 is moved so that one of the detents 346, 347, 348 is aligned with the spring-loaded ball plunger 350, the spring-loaded ball plunger can be biased into the respective detent 346, 347, 348, stabilizing the moveable carrier 330 in position while a desired optical member is in use. In this example, the moveable carrier can comprise three optical members 336, 337, 338 (though more or less can be included). Each of the detents 346, 347, 348 can correspond with proper alignment of a respective optical member 336, 337, 338 with the multi-spectral laser transmitter.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of “or” in this disclosure should be understood to mean non-exclusive or, i.e., “and/or,” unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A switching mechanism for a multispectral laser transmitter, the switching mechanism comprising:

a moveable carrier;

a first optical member supported by an angled flange on a first side of the moveable carrier;

a second optical member supported by the angled flange on the first side of the moveable carrier; and a counterweight disposed on a second side of the moveable carrier opposite from the angled flange, wherein the angled flange extends at a non-right angle relative to the moveable carrier, wherein a planar surface of at least one of the first and second optical members is arranged parallel to a planar surface of the angled flange, and wherein the moveable carrier is operable to selectively move the first optical member into alignment with a laser beam of the multispectral laser transmitter and to selectively move the second optical member into alignment with the laser beam of the multispectral laser transmitter.

2. The switching mechanism of claim 1, wherein the moveable carrier is supported by and rotatable about an axle.

3. The switching mechanism of claim 2, wherein the counterweight disposed on the second side of the moveable carrier balances the moveable carrier about the axle, and wherein the moveable carrier is rotated about the axle by an actuator.

4. The switching mechanism of claim 3, wherein the moveable carrier further comprises a cogged member that interfaces with a gear member, and wherein the actuator comprises a motor operable to drive the gear member.

5. The switching mechanism of claim 1, wherein:

the moveable carrier further comprises:

a first stop surface that interfaces with a first stop when the first optical member is in alignment with the laser beam of the multispectral laser transmitter, and a second stop surface that interfaces with a second stop when the second optical member is in alignment with the laser beam of the multispectral laser transmitter; and an actuator is controlled by a controller operable to cause the actuator to move the moveable carrier such that the first stop surface comes into contact with the first stop to align the first optical member with the laser beam of the multispectral laser transmitter and to cause the actuator to move the moveable carrier such that the second stop surface comes into contact with the second stop to align the second optical member with the laser beam of the multispectral laser transmitter.

6. The switching mechanism of claim 5, wherein, when the first stop surface comes into contact with the first stop, the controller is operable to cause the actuator to maintain a force on the moveable carrier to bias the first stop surface against the first stop, and wherein, when the second stop surface comes into contact with the second stop, the controller is operable to cause the actuator to maintain a force on the moveable carrier to bias the second stop surface against the second stop.

7. The switching mechanism of claim 5, wherein the controller is operable to cause the actuator to decelerate the moveable carrier prior to the first stop surface coming into contact with the first stop, and wherein the controller is operable to cause the actuator to decelerate the moveable carrier prior to the second stop surface coming into contact with the second stop.

8. The switching mechanism of claim 1, wherein the moveable carrier further comprises a plurality of detents operable to interface with a spring-loaded ball plunger to stabilize the moveable carrier while a selected one of the first optical member or the second optical member is in alignment with the laser beam of the multispectral laser transmitter.

9. The switching mechanism of claim 1, wherein the first optical member comprises a first filter that filters light at a first wavelength, and wherein the second optical member comprises a second filter that filters light at a second wavelength.

10. The switching mechanism of claim 1, wherein the first optical member comprises a first filter that filters light at a specified wavelength, and wherein the second optical member comprises a mirror that acts as a shutter and reflects the laser beam.

11. The switching mechanism of claim 1, wherein at least one of the first optical member or the second optical member comprises a polarizer.

12. A modular optical switching system for a multispectral laser transmitter, the system comprising:

a modular housing;

a moveable carrier connected to and disposed within the modular housing;

a first optical member supported by an angled flange on a first side of the moveable carrier;

a second optical member supported by the angled flange on the first side of the moveable carrier; and a counterweight disposed on a second side of the moveable carrier opposite from the angled flange, wherein the angled flange extends at a non-right angle relative to the moveable carrier, wherein a planar surface of at least one of the first and second optical members is arranged parallel to a planar surface of the angled flange, and wherein the moveable carrier is operable to selectively move the first optical member into alignment with a laser beam of the multispectral laser transmitter and to selectively move the second optical member into alignment with the laser beam of the multispectral laser transmitter.

13. The modular optical switching system of claim 12, wherein the modular housing comprises a connecting flange operable to mount the modular housing to a housing of the multispectral laser transmitter.

14. The modular optical switching system of claim 13, wherein the connecting flange comprises:

alignment guides operable to receive alignment pins of the housing of the multispectral laser transmitter to align the modular optical switching system with the multispectral laser transmitter; and through holes extending through the connection flange operable to receive a fastener to mount the connecting flange to the housing of the multispectral laser transmitter.

15. The modular optical switching system of claim 12, further comprising:

an output filter window operable to facilitate transmission of an output portion of the laser beam of the multispectral laser transmitter that passes through the first optical member or the second optical member; and a dump filter window operable to facilitate transmission of a reflected portion of the laser beam of the multispectral laser transmitter that is reflected by the first optical member or the second optical member to a beam dump.

16. The modular optical switching system of claim 12, further comprising an axle mounted to the modular housing, wherein the moveable carrier is supported by and rotatable about the axle.

17. The modular optical switching system of claim 16, further comprising:

a controller;

a first stop; and a second stop;

wherein the moveable carrier further comprises:

a first stop surface that interfaces with the first stop when the first optical member is in alignment with the laser beam of the multispectral laser transmitter, and a second stop surface that interfaces with the second stop when the second optical member is in alignment with the laser beam of the multispectral laser transmitter, wherein the controller is operable to cause an actuator to move the moveable carrier such that the first stop surface comes into contact with the first stop to align the first optical member with the laser beam of the multispectral laser transmitter and to cause the actuator to move the moveable carrier such that the second stop surface comes into contact with the second stop to align the second optical member with the laser beam of the multispectral laser transmitter, and wherein, when the first stop surface comes into contact with the first stop, the controller is operable to cause the actuator to maintain a force on the moveable carrier to bias the first stop surface against the first stop, and wherein, when the second stop surface comes into contact with the second stop, the controller is operable to cause the actuator to maintain a force on the moveable carrier to bias the second stop surface against the second stop.

18. A method for refining a laser beam from a multispectral laser transmitter comprising:

attaching a modular housing of a switching system to a laser housing of the multispectral laser transmitter, the switching system including:

a moveable carrier within the modular housing;

a first optical member supported by an angled flange on a first side of the moveable carrier;

a second optical member supported by the angled flange on the first side of the moveable carrier; and a counterweight disposed on a second side of the moveable carrier opposite from the angled flange, wherein the angled flange extends at a non-right angle relative to the moveable carrier; and wherein a planar surface of at least one of the first and second optical members is arranged parallel to a planar surface of the angled flange;

moving the moveable carrier to align the first optical member with a laser beam transmitted from the multispectral laser transmitter; and moving the moveable carrier to align the second optical member with the laser beam transmitted from the multispectral laser transmitter.

19. The method of claim 18, wherein:

the first optical member comprises a first wavelength filter and, when the first optical member is moved to align with the laser beam transmitted from the multispectral laser transmitter, the method comprises outputting a first output beam having a first wavelength, and the second optical member comprises a second wavelength filter and, when the second optical member is moved to align with the laser beam transmitted from the multispectral laser transmitter, the method comprises outputting a second output beam having a second wavelength.

20. The method of claim 18, wherein the second optical member comprises a mirror that reflects the laser beam to a beam dump.

* * * * *